United States Patent [19]

Sato et al.

[11] 4,452,840
[45] Jun. 5, 1984

[54] PLASTIC INTERLAYER FOR LAMINATION WITH HEIGHTS OF 10 TO 500 MICRONS

[75] Inventors: Takashi Sato; Masahisa Ishikawa, both of Tsuchiura, Japan

[73] Assignee: Mitsubishi Monsanto Chemical Company, Tokyo, Japan

[21] Appl. No.: 350,353

[22] Filed: Feb. 19, 1982

[30] Foreign Application Priority Data

Mar. 12, 1981 [JP] Japan .................................. 56-35888

[51] Int. Cl.³ .............................................. B32B 3/00
[52] U.S. Cl. .................................... 428/156; 428/120; 428/220; 428/437
[58] Field of Search ............... 428/179, 174, 437, 220, 428/156, 120

[56] References Cited

U.S. PATENT DOCUMENTS 3,249,490  5/1966  Lavin et al.
4,035,549  7/1977  Kennar.
4,343,848  8/1982  Leonard, Jr. ........................ 428/156

OTHER PUBLICATIONS

"Manufacturing Processes for Laminated Safety Glass," by G. Barrett, Glass, Dec. 1977, pp. 566–567.

*Primary Examiner*—George F. Lesmes
*Assistant Examiner*—Pamela R. Schwartz
*Attorney, Agent, or Firm*—Oblon, Fisher, Spivak, McClelland & Maier

[57] ABSTRACT

A plastic interlayer for lamination comprises a plastic film or sheet, at least one surface of which has a structure having many separated projections and continuous roots in the same level.

6 Claims, 3 Drawing Figures

PLASTIC INTERLAYER FOR LAMINATION WITH HEIGHTS OF 10 TO 500 MICRONS

BACKGROUND OF THE INVENTION

1. Field of the Invention

The present invention relates to a plastic interlayer having a novel surface structure which is suitable for an adhesive film for a laminated glass and laminated plates such as a solar battery or plastics and glass composites.

2. Description of the Prior Art

An interlayer made of a plastic resin such as polyvinyl butyral, polyacryl resins and polyurethanes has been used as an adhesive film or a reinforcing film for laminating surfaces in a laminated glass and laminated plates such as a solar battery obtained by laminating a silicon wafer photogalvanic sheet between glass plate and a back sheet. For example, in the preparation of the laminated glass, the laminated glass product is prepared by an insertion of an interlayer between glass plates, a preliminary press-bonding process and a final press-bonding process. A nip-roll process, a heat-melt compression or a rubber bag suction can be employed for a pressing and a deairing in the preliminary press-bonding process.

In order to prevent blocking of interlayers, to improve processibility for insertion of an interlayer between glass plates and to improve the deairing effect in the preliminary press-bonding process, a rough surface or a surface having a parallel waved surface is formed on one or both of surfaces thereof, wherein the rough surface forms a random surface having different heights of crests and depths of roots and the parallel waved surface has many parallel grooves. The random surface or the parallel waved surface imparts certain effect for improving the prevention of blocking of interlayers and the processibility for insertion between a pair of glass plates. However, the deairing effect in the preliminary press-bonding is not satisfactorily performed to embed air between the glass plates and the interlayer after the preliminary press-bonding thereby causing serious adverse effect to the durability in bubbling and delamination of the laminated glass after the final press-bonding.

It has been proposed to use the interlayer having a rough random surface in U.S. Pat. No. 4,035,549. The rough random surface has different depths of valleys whereby the deairing property in the preliminary press-bonding is not satisfactory to embed air between the glass plates and the interlayer.

In case of vacuum deairing process, to find optimum process conditions to attain adequate deairing, various tests have been carried out to select a suitable vacuuming rate and a suitable temperature during vacuuming. The testing results show that a conventional interlayer has disadvantages in deairing performance. The conventional interlayer has narrow allowable temperature range. Then, laminated glasses with the conventional interlayer after the final press-bonding show high level of defects caused by residual air resulted by poor deairing during the preliminary press-bonding. Therefore it is not easy to improve productivity of laminating process. In the deairing process by a nip-rolls press or a compression, similar disadvantage has been found. The result is usually inferior to that of the deairing process by the vacuuming.

SUMMARY OF THE INVENTION

It is an object of the present invention to provide a plastic interlayer which has excellent prevention of blocking of interlayers and excellent processibility for insertion between plates and which can be processed in a broad allowable temperature range with excellent deairing effect and fabricatability and can be used in both a deairing process by uniform squeezing or compression or a deairing process by vacuuming (pressure reduction).

The foregoing and other objects of the present invention have been attained by providing a plastic interlayer for lamination which is a plastic film or sheet, at least one surface of which has a structure having many separated projections and continuous roots in the same level.

DETAILED DESCRIPTION OF THE PREFERRED EMBODIMENTS

Figure 1:
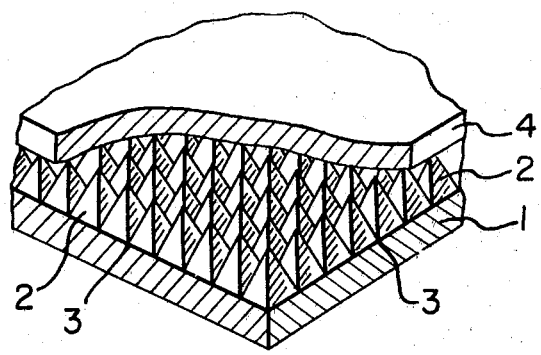
FIG. 1 is a schematic partially sectional view of one embodiment of a plastic interlayer of the present invention on which a glass plate is placed.

The plastic film or sheet used as the interlayer for lamination in the present invention (hereinafter referring to as sheet) is made of a thermoplastic resin which has adhesive property and can be used as an interlayer such as polyvinyl butyral, ethylene-acrylic acid copolymers, ethylene-acrylic ester copolymers, ethylene-vinyl acetate copolymers, ethylene-methyl methacrylate copolymers, hydolyzed products thereof, and polyurethanes. It is optimum to use a polyurethane or a plasticized polyvinyl butyral.

At least one surface of the interlayer of the present invention has many separated projections as crests and continuous roots in the same level. For example, all of the roots are connected on the sheet. Even though the sheet is built up (partially thicker), the roots have the same level as the same depth. At least one surface must have projections. It is preferable to have projections on both surfaces. One surface can be a rough random surface or a waved surface, though the deairing property is slightly inferior.

The configuration of the projections is not critical and is preferably cone, pyramid or prismatoid (which can have a round top or a flat top) in view of uniform adhesive strength and desired deairing in the preliminary press-bonding step.

It is preferably pyramids such as trigonal pyramid, tetragonal pyramid . . . and cone or flat top pyramids such as flat top trigonal or tetragonal pyramid and flat top cone. The tetragonal pyramid or flat top tetragonal pyramid is optimum in view of deairing effect in the preliminary press-bonding process.

The configurations of pyramids on one surface are not limited to the same configuration and can be mixed different configurations of trigonal pyramid (or flat tops pyramid), tetragonal pyramid (or flat top pyramid) or cone (or flat top cone). The size of the projections having the form of the cone, pyramid or flat top cone or pyramid is depending upon the usage of the interlayer, the temperature and time for bonding, etc. and is preferably in a range of 10 to 500μ especially 15 to 360μ in height. In the case of the tetragonal pyramid or the flat top tetragonal pyramid, a width of the bottom is preferably in a range of 100 to 850μ, especially 140 to 450μ. A diameter of the bottom of the cone can be easily considered from the width of the tetragonal pyramid. A width of the flat top surface can be selected as desired depending upon the condition of the processing.

Many projections on the surface of the interlayer have different size but preferably have the same size. When many projections have different size, it is preferable to have similar distribution (at random) of sizes of the projections. The distribution of the projections can be regular or irregular and is preferably orthogonal matrix (lattice) arrangement so as to connect roots in a lattice form. A width of the root as a gap between bottoms of adjacent projections is allowed and is preferably smaller than the width of the bottom of the projection, especially ⅓ or less of the width of the bottom of the projection. In the optimum embodiment of the interlayer of the present invention, many regular tetragonal pyramid projections or regular tetragonal pyramid projections having each flat top are formed to give orthogonal roots (lattice).

A thickness of the interlayer of the present invention is preferably in a range of 0.1 to 5 mm, especially 0.2 to 3 mm as the total thickness including the projections, as an interlayer for various usages, especially for the laminated glass. If necessary, two or more interlayers having desired thickness can be used in the form of lamination.

The process for producing the interlayer having the novel surface structure is not critical and can be a calender roll process, an embossing roll process, a press embossing process, an irregular extruding process, a powder blasting process, a chemical etching process, a mechanical etching process, and a draw-shaping process. The interlayer produced by the calender roll process, the embossing roll process, the press embossing process or the irregular extruding process is especially preferable in view of fabricatability and properties of the interlayer.

Referring to the drawings, the interlayer of the present invention will be further illustrated.

FIG. 1 is a schematic view of one embodiment of the interlayer of the present invention, wherein many tetragonal pyramid projections are arranged to form a continuous lattice form of roots on the surface of the interlayer, and a glass plate for the preliminary press-bonding (partially broken form) is placed on it.

Figure 2:
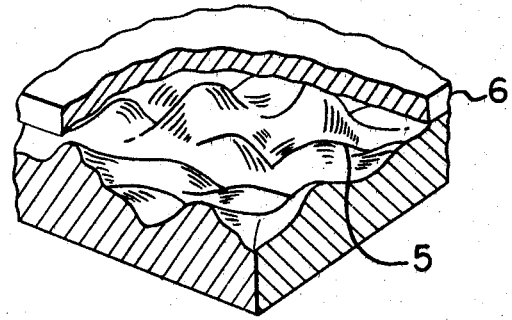
FIG. 2 is a schematic partially sectional view of a conventional interlayer having a rough random surface.

FIG. 2 is a schematic view of the conventional interlayer having a rough random surface and a glass plate for the preliminary press-bonding (partially broken form) is placed on the projections.

Figure 3:
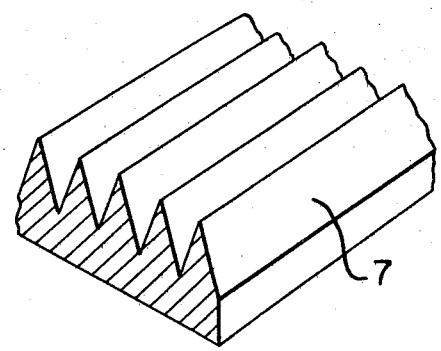
FIG. 3 is a schematic view of a conventional interlayer having a parallel waved surface.

FIG. 3 is a schematic view of the conventional interlayer having a parallel waved surface.

In the drawings, the reference numeral (1) designates a plastic sheet; (2) designates tetragonal pyramid projections formed on the surface of the sheet (1) in one-body; (3) designates a root; (4) designates a glass plate; (5) designates a rough random surface; (6) designates a glass plate; (7) designates a waved surface.

As shown in FIG. 1, the tetragonal pyramid projections are arranged on the sheet (1) of the interlayer of the present invention. The most deep parts of the roots (3) are in the same level as the level of the sheet (1) and are arranged in orthogonal. The continuous roots (3) in the same level together with the pressed strength of the pyramid projections impart excellent preliminary press-bonding effect in the preliminary press-bonding of the glass plates by deairing in all directions.

On the other hand, the interlayer having the rough random surface (5) shown in FIG. 2 has many projections having different sizes and roots which have different depths. The roots are separated and are not in the same level. Therefore, the deairing from the roots in the preliminary press-bonding of the glass plates (6) is not enough whereby air is embedded.

In the interlayer having the parallel waved surface (7) shown in FIG. 3, the parallel ribs are pressed in random to embed air.

When the plastic interlayer for lamination of the present invention is used for a preparation of the laminated glass by the vacuuming process, the interlayer is held between two glass plates the temperature of which is controlled and the exposed part of interlayer is cut and the glass plates are kept in a rubber bag by which is connected to a suction system to perform the deairing of air between the glass plates and the interlayer, and the interlayer is semi-melted by external heating and the glass plates are pressed under the pressure difference from the atmospheric pressure to complete the preliminary press-bonding. The laminated glass obtained by the preliminary press-bonding is kept in an autoclave using air or oil as a heat medium and the interlayer and the glass plates are press-bonded under high pressure at high temperature to dissolve the residual air into the interlayer and to smooth the interlayer thereby preparing a transparent laminated glass.

The deairing effect after the preliminary press-bonding process is usually shown as a transparency. That is, light is emitted at a specific angle to the laminated glass obtained by the preliminary press-bonding process and the transmitted light is measured. The transparency after the preliminary press-bonding process is rated as 0% under the condition holding the interlayer between a pair of the glass plates and 100% under the condition of the completely transparent laminated product. The measured datum is the indication of degree of the surface condition of the interlayer smoothed by the preliminary press-bonding process.

A content of the residual air in the transparent laminated glass obtained by the final press-bonding process is shown by a bubbling rate in a baking test. That is, the laminated product is heated at a predetermined temperature for a predetermined time to change the residual air in the laminated glass into bubbles and this is used as an indication of the deairing effect in the preliminary press-bonding process.

The plastic interlayer for lamination of the present invention can be processed in a broad temperature range and the deairing effect is attained at relatively low temperature for a short heating time. Various deairing processes can be employed. The laminated glass obtained after the final press-bonding process has remarkably excellent durability in bubbling and delamination. When the interlayer is printed, the printing ink is printed and is distributed as desired without light and shade. The advantage of the present invention is especially high in the preparation of a laminated glass for light shield as well as the usual laminated glasses.

The interlayer for lamination of present invention will be further illustrated by certain examples and references which are provided for purposes of illustration only and are not intended to be limiting the present invention.

In the examples, the preparation of the laminated glass and the measurements of the surface condition of the interlayer, the transparency of the product after the preliminary press-bonding and the bubbling rate of the product after the final press-bonding in the baking test are as follows:

Preparation of laminated glass A

After measuring a surface condition of an interlayer, the interlayer was held between a pair of glass plates and exceeded parts of the interlayer were cut. At least six sets of the laminated products were put in a rubber bag and a temperature just before the preliminary press-bonding was set to 25° C., 40° C. or 60° C. by heating. The rubber bag was connected to a suction system and was heated at an external temperature of 117° C. under a vacuum of 500 mmHg. After 15 min., the vacuum of the rubber bag was returned to the atmospheric pressure to complete the preliminary press-bonding process.

After measuring a transparency, the laminated product obtained by the preliminary press-bonding was put in an autoclave and treated at 135° C. under a pressure of 13.5 kg/cm² for 6 minutes. The temperature was brought down to 55° C. to give the atmospheric pressure. The laminated glass was prepared by this final press-bonding process.

Preparation of laminated glass B

After measuring a surface condition of an interlayer, the interlayer was held between a pair of glass plates and exceeded parts of the interlayer were cut. The laminated product was kept in an oven and a temperature of the laminated product was controlled to various temperature. The heated laminated product was passed through a pair of nip rolls to perform the deairing by the rolling process in the preliminary press-bonding process.

A laminated glass was prepared by the same final press-bonding process as the process A.

(a) Surface condition

The surface condition was observed by microscopic observation.

(b) Transparency

Standard laminated glasses having different transparency of each 10% interval in the range of 0 to 100% were prepared by using a glossmeter (Murakami Shikisai Gijutsu Kenkyu Sho).

Each light was emitted to the laminated glass and the standard laminated glasses at an incident angle of 45 degree, and light transmittances were compared at the place of the angle of 45 degree by visible comparison to rate the transparency of the sample in each 5% interval.

Transparencies of at least six samples obtained by using the same kind of the interlayer in the preliminary press-bonding were measured and an average thereof was calculated.

(c) Bubbling rate in baking test

At least six lamminated glasses obtained by using the same kind of the interlayer in the final press-bonding process were put in an oven to heat them at 135° C. for 2 hours. The samples were taken out of the oven and cooled at room temperature for at least three hours. A number of samples bubbling in the interlayer was divided by the total number of the samples to give a bubbling rate.

EXAMPLES 1 AND 2 AND REFERENCES 1 AND 2

Each polyvinyl butyral interlayer having the configuration and the size shown in Table 1 was produced by a calender rolling process or an embossing process. Each laminated glass was prepared by using the interlayer in the process A and the transparency and the bubbling rate by baking test were measured. The results are shown in Table 1.

As a reference, the same test was carried out by using a commercially available interlayer having a rough random surface or a commercially available interlayer having a fine random surface. The results are also shown in Table 1.

TABLE 1

|  | Exp. 1 | | | Exp. 2 | | | Ref. 1 | | Ref. 2 | |
|---|---|---|---|---|---|---|---|---|---|---|
| Interlayer Surface condition: | | | | | | | | | | |
| Configuration and arrangement of projections | (I) | | | (II) | | | (III) | | (IV) | |
| Height (μ) | 50 | | | 100 | | | 50 (ava.) | | 100 (ava.) | |
| Width of bottom (μ) | 190 | | | 300 | | | — | | — | |
| Pitch (μ) (between tops of projections) | 190 | | | 390 | | | 300 (ava.) | | 600 (ava.) | |
| Temperature just before preliminary press-bonding (°C.) | 25 | 40 | 60 | 25 | 40 | 60 | 25 | 60 | 25 | 60 |
| Transparency (%) | 72 | 65 | 63 | 53 | 58 | 62 | 38 | 25 | 28 | 60 |
| Backing Test*¹ | 0/6 | 0/6 | 0/6 | 0/6 | 0/6 | 0/6 | 1/6 | 4/6 | 3/6 | 0/6 |
| Remark | | | | | | | *2 | | *3 | |

Note:
ava.: average.
(I),(II): normal tetragonal pyramid projections
(III): fine waved surface in random
(IV): rough waved surface in random
*¹bubbled samples/total samples
*²projections in peripheral parts are previously pressed at 60° C. in the preliminary press-bonding
*³projections are not easily pressed at 25° C. and air is fed in after the preliminary press-bonding The interlayer of the present invention can be used in a broad range as the temperature just before the preliminary press-bonding regardless of size of projections of the interlayer and can be used without a special control of the temperature of the glass plates regardless of seasons of summer and winter.

On the other hand, in the case of the use of the commercially available interlayer having a rough random surface, the deairing effect can be satisfactory if the interlayer is treated at the optimum temperature whereas the projections are not easily pressed at a lower temperature just before the preliminary press-bonding and air is fed at the release of the pressure after the preliminary press-bonding.

In the case of the use of the interlayer having the fine random surface, projections in the peripheral parts of the glass plates are pressed to residual air in the central part of the interlayer between the glass plates regardless of a temperature just before the preliminary press-bonding.

EXAMPLES 3 AND 4 AND REFERENCES 3 AND 4

Each interlayer used in the Examples 1 and 2 and References 1 and 2, was used in the process B at a constant nip roll pressure to prepare each laminated glass.

The temperature just before rolling by the nip rolls; the transparency and the bubbling rate by baking test were measured. The results are shown in Table 2.

TABLE 2

|  | Exp. 3 | | | Ref. 3 | | | Exp. 4 | | | Ref. 4 | | |
| --- | --- | --- | --- | --- | --- | --- | --- | --- | --- | --- | --- | --- |
| Interlayer (correspondency) | Exp. 1 | | | Ref. 1 | | | Exp. 2 | | | Ref. 2 | | |
| Temperature of laminated product just before nipping (°C.) | 45 | 65 | 85. | 45 | 65 | 85 | 45 | 65 | 85 | 45 | 65 | 85 |
| Transparency (%) | 19 | 23 | 32 | 13 | 20 | 25 | 15 | 18 | 28 | 0 | 3 | 8 |
| Baking test (bubbled samples/total samples) | 0/6 | 0/6 | 0/6 | 1/6 | 0/6 | 1/6 | 0/6 | 0/6 | 0/6 | 6/6 | 6/6 | 6/6 |

The results show the following fact. The interlayer having the tetragonal pyramid projections can be used at the temperature of the laminated product ranging at least from 45° to 85° C. just before nipping. The range of the temperature is broad to be remarkably convenient in the processing.

On the other hand, the interlayer having the rough random surface can not be used at lower than 85° C. and the interlayer having the fine random surface can be used only at lower than 65° C. The allowable range of the temperature in the process is remarkably narrow. As the allowable temperature range, the former is in the range of 90° to 100° C. and the latter is in the range of 60° to 65° C.

I claim:

1. A plastic interlayer for lamination, said interlayer comprising a thermoplastic film or sheet at least one surface of which has many uniformly shaped projections:
    (a) at least substantially all of the projections on the surface being uniformly spaced from one another in both directions on said at least one surface;
    (b) both the crests and the roots of at least substantially all said projections being at the same levels; and
    (c) the heights of which are in a range of 10μ to 500μ.
2. A plastic interlayer as recited in claim 1 wherein said plastic film or sheet is composed of a plasticized polyvinyl butyral.
3. A plastic interlayer as recited in claim 1 wherein said projections are symmetrical about axes perpendicular to said at least one surface.
4. A plastic interlayer as recited in claim 1 wherein said projections are shaped as cones, pyramids, flat-topped cones, or flat-topped pyramids.
5. A plastic interlayer as recited in claim 4 wherein said projections are shaped as tetragonal pyramids or flat-topped tetragonal pyramids.
6. A plastic interlayer as recited in claim 1 wherein the roots of said projections form a continuous lattice.

* * * * *